US012073817B2

(12) United States Patent
Tomimatsu et al.

(10) Patent No.: US 12,073,817 B2
(45) **Date of Patent: *Aug. 27, 2024**

(54) SOUND ABSORBING MEMBER, SOUND ABSORBING APPARATUS, AND SOUND ABSORBING STRUCTURE

(71) Applicant: Yamaha Corporation, Hamamatsu (JP)

(72) Inventors: Kiyoyuki Tomimatsu, Hamamatsu (JP); Yoshikazu Honji, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 528 days.

This patent is subject to a terminal disclaimer.

(21) Appl. No.: 17/307,666

(22) Filed: May 4, 2021

(65) Prior Publication Data

US 2021/0256948 A1 Aug. 19, 2021

Related U.S. Application Data

(63) Continuation of application No. PCT/JP2018/040992, filed on Nov. 5, 2018.

(51) Int. Cl.
*G10K 11/172* (2006.01)

(52) U.S. Cl.
CPC .................................. *G10K 11/172* (2013.01)

(58) Field of Classification Search
CPC .................................................... G10K 11/172
See application file for complete search history.

(56) References Cited

U.S. PATENT DOCUMENTS

| | | | | |
|---|---|---|---|---|
| 7,913,813 | B1 | 3/2011 | Mathur | |
| 11,514,879 | B2 * | 11/2022 | Honji | G10K 11/162 |
| 2019/0389170 | A1 * | 12/2019 | Ueno | B60R 13/08 |
| 2020/0143782 | A1 * | 5/2020 | Honji | G10K 11/172 |

FOREIGN PATENT DOCUMENTS

| | | | |
|---|---|---|---|
| JP | 2013-8012 | A | 1/2013 |
| JP | 2013-164229 | A | 8/2013 |
| JP | 2017-15972 | A | 1/2017 |

OTHER PUBLICATIONS

International Search Report (PCT/ISA/210) issued in PCT Application No. PCT/JP2018/040992 dated Jan. 15, 2019 with English translation (four (4) pages).
Japanese-language Written Opinion (PCT/ISA/237) issued in PCT Application No. PCT/JP2018/040992 dated Jan. 15, 2019 (three (3) pages).
English translation (Japanese-language Written Opinion (PCT/ISA/237) filed on May 4, 2021) issued in PCT Application No. PCT/JP2018/040992 dated Jan. 15, 2019 (four (4) pages).

(Continued)

*Primary Examiner* — Forrest M Phillips
(74) *Attorney, Agent, or Firm* — Crowell & Moring LLP

(57) ABSTRACT

A sound absorbing member includes a first end face, a second end face, and a side face. The second end face is opposite to the first end face. The side face is positioned between the first end face and the second end face. The sound absorbing member is insertable into an aperture provided on a plate-like or sheet-like base material. The sound absorbing member has a tubular shape. The first end face includes a first opening. The side face includes at least one second opening.

13 Claims, 12 Drawing Sheets

(56) References Cited

OTHER PUBLICATIONS

Chinese-language Office Action issued in Chinese Application No. 201880099140.5 dated Sep. 21, 2023 with English translation (17 pages).
Chinese-language Office Action issued in Chinese Application No. 201880099140.5 dated Feb. 22, 2024 with English translation (15 pages).
Chinese-language Office Action issued in Chinese Application No. 201880099140.5 dated May 10, 2024 with English translation (14 pages).

* cited by examiner

SOUND ABSORBING MEMBER, SOUND ABSORBING APPARATUS, AND SOUND ABSORBING STRUCTURE

CROSS-REFERENCE TO RELATED APPLICATION

This Application is a Continuation Application of PCT Application No. PCT/JP2018/040992, filed on Nov. 5, 2018, the entire contents of which is incorporated herein by reference.

BACKGROUND

Field

The present disclosure relates to a sound absorbing member, to a sound absorbing apparatus, and to a sound absorbing structure.

Background Information

An existing sound absorbing structure that produces Helmholtz resonance includes a sound absorbing structure that includes a plate-like member having openings. The plate-like member faces a wall body via an air layer. The sound absorbing structure further includes tubular extension members respectively connected to the openings of the plate-like member. At least a part of each of the extension members is housed in the air layer with the at least part of each of the extension members separated from the wall body. A plasterboard serves as an example of the plate-like member.

However, the existing sound absorbing structure disclosed has the following problems A and B.

Problem A: the plate-like member is a substantially rigid body, and therefore, the sound absorbing structure cannot be installed along a curved wall surface.

Problem B: since the extension members need to be apart from the wall body, it is difficult to make the distance uniform between the plate-like member and the wall body when the plate-like member is formed of a pliable member. Consequentially, it is difficult to obtain desired sound absorbing effects. If the extension members are in contact with the wall body, the openings of the extension members are sealed by the wall body. Therefore, the sound absorbing effects cannot be obtained.

SUMMARY

In view of the above circumstances, the present disclosure has as an object to obtain a desired sound absorbing effect even in a case in which a wall surface of a wall body is a curved surface.

In one aspect, a sound absorbing member is to be inserted into an aperture provided on a plate-like or sheet-like base material. The sound absorbing member has a tubular shape. The sound absorbing member includes a first end face, a second end face opposite to the first end face, and a side face positioned between the first end face and the second end face. The first end face includes a first opening. The side face includes at least one second opening.

In another aspect, a sound absorbing apparatus includes a plurality of sound absorbing members, and a plate-like or sheet-like base material having a plurality of first apertures to which the sound absorbing members are respectively inserted. Each of the sound absorbing members has a tubular shape. Each of the sound absorbing members includes a first end face, a second end face opposite to the first end face, and a side face positioned between the first end face and the second end face. The first end face includes a first opening. The side face includes at least one second opening.

In still another aspect, a sound absorbing structure includes a sound absorbing apparatus, and a wall body. The sound absorbing apparatus includes a plurality of sound absorbing members, and a plate-like or sheet-like base material having a plurality of first apertures to which the sound absorbing members are respectively inserted. Each of the sound absorbing members has a tubular shape. Each of the sound absorbing members includes a first end face, a second end face opposite to the first end face, and a side face positioned between the first end face and the second end face. The first end face includes a first opening. The side face includes at least one second opening. The wall body supports the base material via the sound absorbing members.

Other objects, advantages and novel features of the present disclosure will become apparent from the following detailed description of one or more preferred embodiments when considered in conjunction with the accompanying drawings.

DETAILED DESCRIPTION

Figure 1:
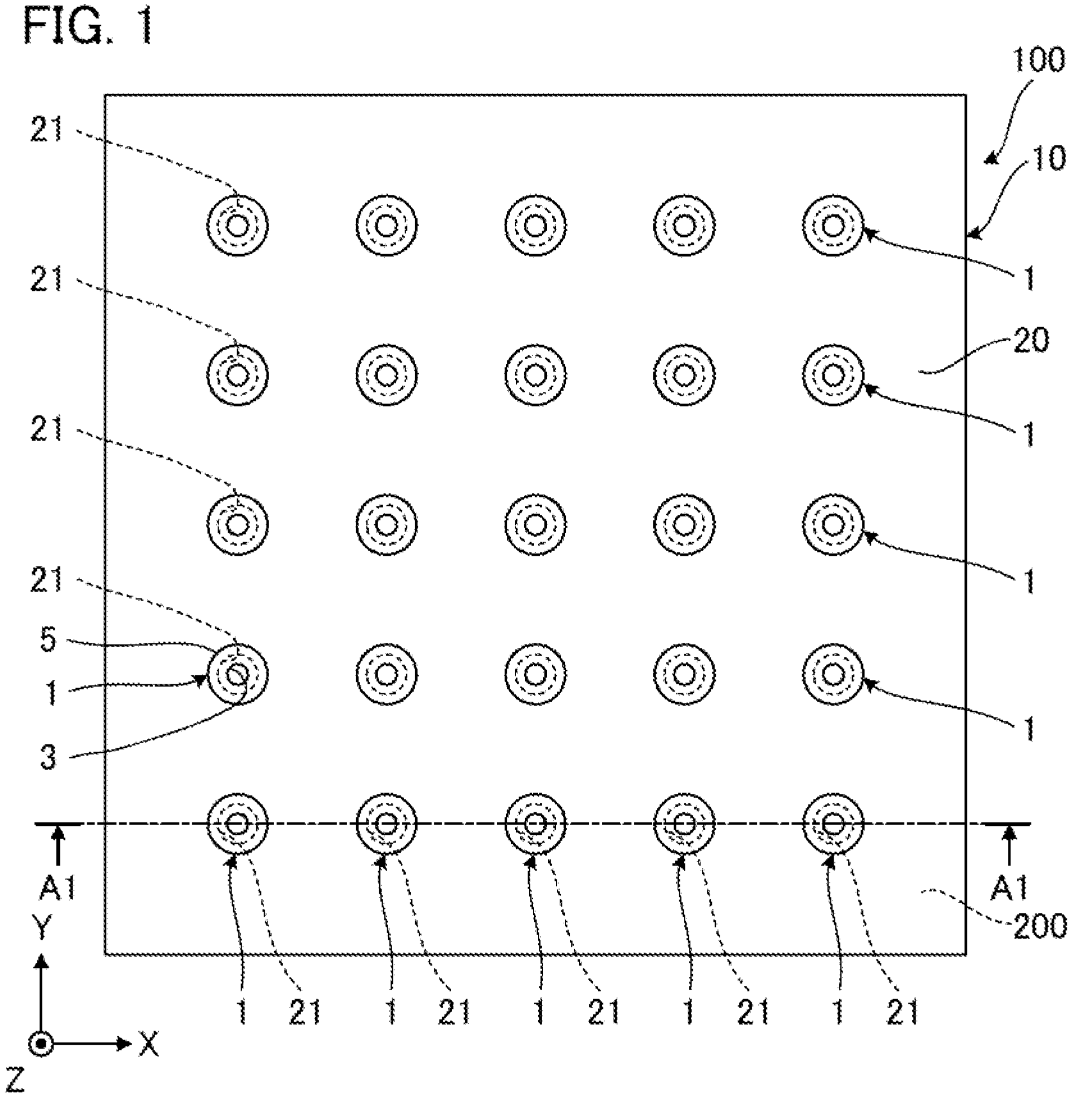
FIG. 1 is a plan view of a sound absorbing structure.

An embodiment according to the present disclosure will be explained below with reference to the drawings. In the drawings, the dimensions and scales of respective elements may be different from those of actual ones as appropriate. Embodiments described below are examples of the present disclosure. Therefore, various limitations are included in the embodiments. However, the scope of the present disclosure is not limited to the embodiments described below.

1. Configuration of Sound Absorbing Structure

Figure 2:
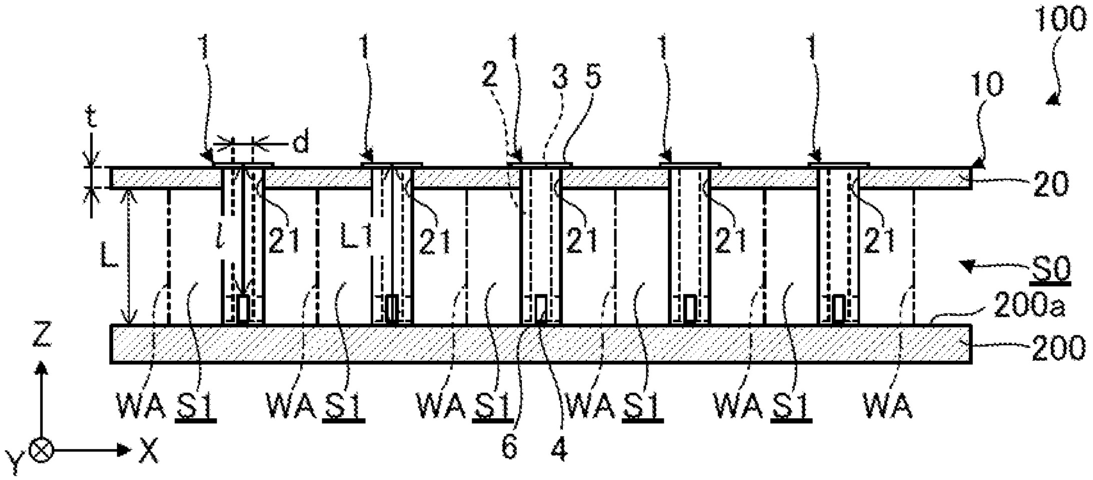
FIG. 2 is a sectional view along line A1-A1 in FIG. 1.

FIG. 1 is a plan view of a sound absorbing structure 100 according to an embodiment. FIG. 2 is a sectional view along line A1-A1 in FIG. 1. The sound absorbing structure 100 illustrated in FIGS. 1 and 2 is a structure that absorbs sound by producing Helmholtz resonance. The sound absorbing structure 100 includes a wall body 200 and a sound absorbing apparatus 10 installed on the wall body 200. The sound absorbing apparatus 10 includes a plate-like or sheet-like base material 20 and tubular sound absorbing members 1 penetrating through the base material 20. The base material 20 is supported on the wall body 200 via the sound absorbing members 1. A space S0 is formed between the wall body 200 and the base material 20. The space S0 communicates with an external space through the sound absorbing members 1. The space S0 is divided into spaces S1 respectively corresponding to the sound absorbing members 1. Each of the spaces S1 functions as a cavity of a container of a typical Helmholtz resonator. The parts of the sound absorbing structure 100 are explained below.

As illustrated in FIGS. 1 and 2, a direction (a right-left direction in FIG. 1) along a wall surface 200*a* of the wall body 200 is represented as an X direction, a direction (an upper-lower direction in FIG. 1) orthogonal to the X direction along the wall surface 200*a* is represented as a Y direction, and a direction normal to the wall surface 200*a* is represented as a Z direction in the following explanations. The right side in FIG. 1 is the positive side of the X direction and the left side is the negative side of the X direction. The upper side in FIG. 1 is the positive side of the Y direction and the lower side is the negative side of the Y direction. The front side of the plane of paper in FIG. 1 is the positive side of the Z direction and the back side is the negative side of the Z direction. In the following explanations, a state seen from the Z direction is referred to as "planar view."

The wall body 200 is a structure that supports the sound absorbing apparatus 10. The wall body 200 is, for example, a casing included in an audio device such as a speaker system, a panel used for a door or the like of a mobile object such as a vehicle, an inner wall of a building, or a structure fixed to any thereof. Application examples in which the sound absorbing structure 100 is installed in a speaker system or on a vehicle door will be described later.

The base material 20 is a plate-shaped or sheet-shaped member including apertures 21. The base material 20 may be pliable, in other words, may have flexibility. Due to the pliability of the base material 20, the base material 20 can be deformed along the wall surface 200*a* of the wall body 200 in order to be arranged on the wall surface 200*a* even when the wall surface 200*a* is a curved surface. The constituent material of the base material 20 is not particularly limited, and examples thereof are an elastomer material, a resin material, and a metallic material. As long as the sound absorbing structure 100 can produce Helmholtz resonance, the base material 20 may be formed of a dense body or may be formed of a porous body. A thickness t of the base material 20 is determined according to, for example, the strength required for the base material 20, and the ease in handling required for the base material 20. The thickness t of the base material 20 may be, for example, not less than 1 millimeter and not more than 10 millimeters with the objective of causing the base material 20 to be pliable, although this is not particularly limited thereto. The shape or the size of the base material 20 in a planar view is not limited to the example illustrated in FIG. 1 and is appropriately set according to, for example, the installation locations of the sound absorbing structure 100, and the sound absorbing characteristics of the sound absorbing structure 100.

Each of the apertures 21 is an aperture into which the sound absorbing member 1 is inserted. In the example illustrated in FIG. 1, the apertures 21 are arranged regularly in a matrix in a planar view. A planar view shape of each of the apertures 21 illustrated in FIG. 1 is a circle. The number of the apertures 21, the number of rows, the number of columns, the row pitch, and the column pitch thereof are determined according to, for example, the size of the sound absorbing structure 100, and the sound absorbing characteristics of the sound absorbing structure 100 and are not limited to the example illustrated in FIG. 1. The arrangement of the apertures 21 is not limited to the example illustrated in FIG. 1 and may be, for example, other regular arrangements such as a staggered arrangement. The planar view shape of each of the apertures 21 is determined according to, for example, the external form of the sound absorbing member 1 and may be, for example, a polygon such as a quadrangle, a pentagon, or a hexagon without being limited to a circle.

The sound absorbing members 1 are tubular members respectively inserted into the apertures 21 of the base material 20. The sound absorbing members 1 cause the space S0 to communicate with the external space. The constituent material of the sound absorbing members 1 is not particularly limited, and examples thereof are a resin material, a carbon material, a metallic material, a ceramic material, and a composite material including two or more thereof. Among these materials, a resin material is higher in moldability, lighter in weight, and lower in cost than other materials.

Figure 3:
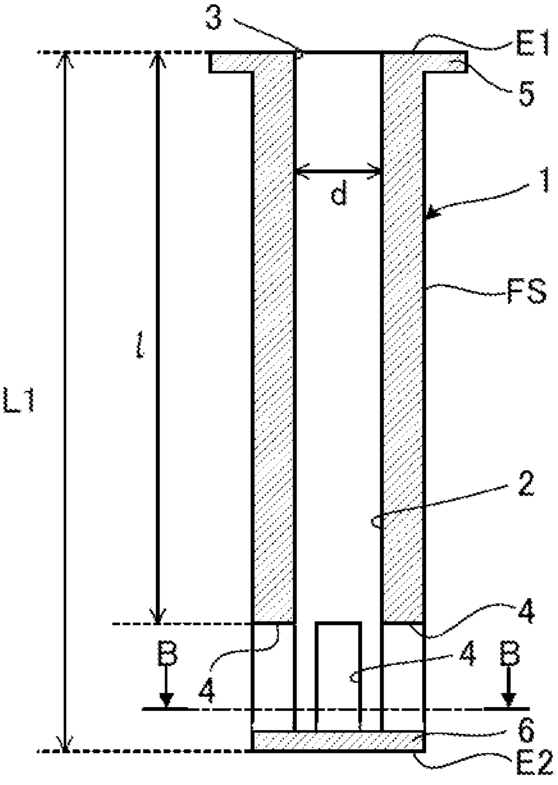
FIG. 3 is a longitudinal sectional view of a sound absorbing member.
Figure 4:
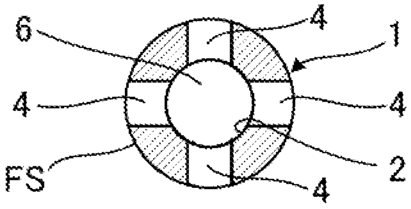
FIG. 4 is a sectional view along line B-B in FIG. 3.

FIG. 3 is a longitudinal sectional view of the sound absorbing member 1 in the embodiment. FIG. 4 is a sectional view along line B-B in FIG. 3. As illustrated in FIG. 3, the sound absorbing member 1 has a tubular shape. The sound absorbing member 1 includes a hollow portion 2. The sound absorbing member 1 includes a first end face E1, a second end face E2 opposite to the first end face E1, and a side face FS positioned between the first end face E1 and the second end face E2.

The first end face E1 of the sound absorbing member 1 includes a first opening 3 communicating with the hollow portion 2. The side face FS of the sound absorbing member 1 includes second openings 4 communicating with the hollow portion 2. The distance from each of the second openings 4 to the second end face E2 is shorter than the distance from each of the second openings 4 to the first end face E1. Each of the second openings 4 communicates with the first opening 3 via the hollow portion 2. Therefore, the sound absorbing member 1 functions as a tube of a typical Helmholtz resonator.

Since the second openings 4 are provided on the side face FS, the second openings 4 are not sealed by the wall body 200 even when the second end face E2 contacts the wall body 200. Therefore, the sound absorbing member 1 functions as a tube of a typical Helmholtz resonator even when the second end face E2 contacts the wall body 200. The total of the respective opening areas of the second openings 4 may be equal to or greater than the opening area of the first opening 3 with the objective of appropriately satisfying this function. In other words, the second openings 4 have an opening area equal to or greater than an opening area of the first opening 3. As illustrated in FIG. 4, the second openings 4 are arranged side by side in a circumferential direction of the side face FS. This arrangement has an advantage that the mechanical strength of the sound absorbing member 1 is likely to increase even when the second openings 4 have a required opening area compared to a sound absorbing member that includes one second opening 4 having the required opening area. The distance from each of the second openings 4 to the second end face E2 is shorter than the distance from each of the second openings 4 to the first end face E1. Consequently, a length l of a portion corresponding to the tube of a typical Helmholtz resonator in the sound absorbing member 1 can be lengthened compared to a sound absorbing member in which the distance from each of the second openings 4 to the second end face E2 is not shorter than the distance from each of the second openings 4 to the first end face E1. Therefore, the frequency band in which the sound absorbing structure 100 can absorb sound can be lowered while a length LI of the sound absorbing member 1 is shortened. While the number of the second openings 4 is four in the example illustrated in FIG. 4, the number is not limited thereto and may be, for example, three or less, or five or more. The second openings 4 are an example of at least one second opening. One second opening 4 is an example of at least one second opening.

A flange 5 protruding from the side face FS is provided on the sound absorbing member 1 along an outer circumference of the first end face E1. In other words, the side face FS includes the flange 5. The flange 5 is contacted with one face (a face on the upper side in FIG. 2) of the base material 20 to restrict the position of the sound absorbing member 1 with respect to the base material 20. That is, the sound absorbing members 1 can be positioned with respect to the base material 20 by the flanges 5. Accordingly, it is possible to reduce variation of the frequency band caused by misalignment of the sound absorbing members 1 with respect to the base material 20. The frequency band means a frequency band in which the sound absorbing structure 100 can absorb sound. A face of the flange 5 facing the base material 20 can be used as a bonding surface for bonding to the base material 20. Therefore, the flange 5 is fixed to the base material 20 with an adhesive or a pressure-sensitive adhesive, as required. The external form of the flange 5 in a planar view in the present embodiment is a circle. The amount of protrusion of the flange 5 to the outside is, for example, in a range of not less than 0.1 millimeters and not more than 5 millimeters, although this is not particularly limited. The thickness of the flange 5 is in a range of not less than 0.1 millimeters and not more than 5 millimeters, although this is not particularly limited. The external form of the flange 5 in a planar view is not limited to a circle and may be, for example, a polygon such as a quadrangle, a pentagon, or a hexagon. The flange 5 may be omitted.

The second end face E2 of the sound absorbing member 1 in the present embodiment is a bottom 6 that seals one end of the sound absorbing member 1. That is, one end of the tubular sound absorbing member 1 is sealed by the bottom and the other end of the tubular sound absorbing member 1 is open. The second end face E2 is fixed to the wall body 200. The sound absorbing members 1 function as spacers that define a distance L between the base material 20 and the wall body 200. Accordingly, even when the wall surface 200*a* of the wall body 200 is a curved surface, the distance L between the base material 20 and the wall body 200 can be made uniform and a desired sound absorbing effect of the sound absorbing structure 100 is consequently obtained.

Figure 5:
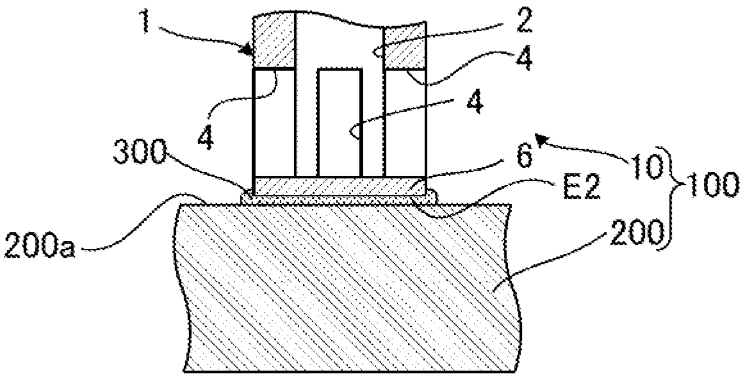
FIG. 5 is a diagram illustrating a fixed state of the sound absorbing members and a wall body.

FIG. 5 is a diagram illustrating a fixed state of the sound absorbing members 1 and the wall body 200 in the present embodiment. In the present embodiment, the bottom 6 is fixed to the wall body 200 with a bonding agent 300, as illustrated in FIG. 5. With the bottom 6 included in each of the sound absorbing members 1, the area of the second end face E2 can increase compared to a construction in which an opening is provided on the second end face E2 in an embodiment, which is described later. Therefore, there is an advantage in that, in a case in which the sound absorbing members 1 are fixed to the wall body 200 by bonding the second end face E2 to the wall body 200 with the bonding agent 300, the strength of the bonding is likely to increase. When the second end face E2 is fixed to the wall body 200 with a bonding agent in a case in which an opening is provided on the second end face E2, there is a possibility that the bonding agent will penetrate into the opening and the bonding agent will partially seal the second openings 4. Therefore, this case has a problem in that the frequency band in which the sound absorbing structure 100 can absorb sound is likely to vary with variation in the opening area of the second openings 4. In contrast thereto, the structure of the present embodiment also has an advantage of being capable of preventing occurrence of the problem described above. The bonding agent 300 is a known adhesive or pressure-sensitive adhesive. At least one of the sound absorbing members 1 may be fixed to the wall body 200. Some of the sound absorbing members 1 may not be fixed to the wall body 200.

Figure 6:
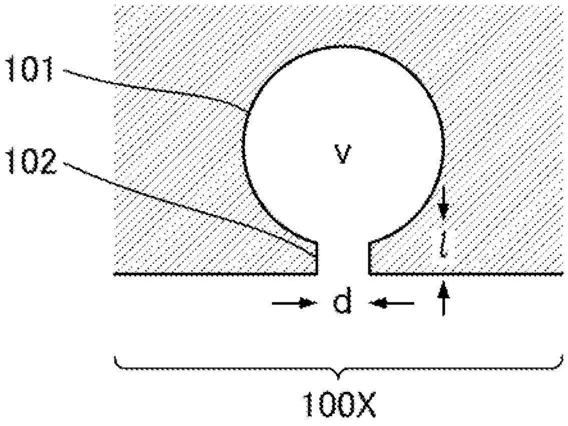
FIG. 6 is a diagram illustrating the concept of a typical Helmholtz resonator.

FIG. 6 is a diagram illustrating the concept of a typical Helmholtz resonator 100X. The Helmholtz resonator 100X includes a container 101 and a tube 102 connected to the container 101. In the Helmholtz resonator 100X, air in the container 101 and air in the tube 102 constitute a vibration system. In the vibration system, the air in the tube 102 serves as the mass and the air in the container 101 serves as a spring. When this vibration system resonates, the air in the tube 102 vibrates strongly and a sound absorbing action is therefore produced due to frictional loss of the air in the tube 102. When the volume in the container 101 is V, the length of the tube 102 is l, and the transverse sectional area in the tube 102 is s, a resonance frequency $f_0$ of the Helmholtz resonator 100X is represented by the following Equation (1).

[Equation 1]

$$f_0=c/2\sqrt{\pi s/V(l+\delta)} \tag{1}$$

In this Equation (1), c denotes the speed of sound in air. Furthermore, δ denotes the opening-end correction value. In a case in which the transverse sectional shape in the tube 102 is a circle, δ is expressed as $\delta \cong 0.8*d$ where the diameter in the tube 102 is d.

In the sound absorbing structure 100 having the configuration described above, the space S0 is divided into spaces S1 due to balance of pressures from the sound absorbing members 1 and portions dividing the space S0 into the spaces S1 function as walls WA. Therefore, the space S0 is divided by the walls WA into the spaces S1 that correspond to the sound absorbing members 1, respectively. Each of the spaces S1 corresponds to a space in the container 101 described above. A part of the hollow portion 2 between the first opening 3 and the second openings 4 corresponds to the tube 102 described above. Therefore, the length of this part corresponds to the length l described above. When the aperture ratio of the base material 20 based on the first openings 3 is P and the distance between the base material 20 and the wall body 200 is L, P/L has a relationship approximated by s/V described above. Accordingly, from this relationship and the Equation (1) described above, the resonance frequency $f_0$ of the sound absorbing structure 100 is represented by the following Equation (2).

[Equation 2]

$$f_0=c/2\sqrt{\pi P/L(l+\delta)} \quad (2)$$

As is understood from this Equation (2), the resonance frequency $f_0$, which is a frequency which the sound absorbing structure 100 can absorb sound, can be adjusted according to the aperture ratio P, the distance L, and the length l. The resonance frequency $f_0$ can decrease with increasing distance L or length l.

In the sound absorbing structure 100 described above, a large part of each of the sound absorbing members 1 is arranged in the space S0. Therefore, even when the distance L or the length l is increased, the thickness of the sound absorbing structure 100 can decrease relative to a case in which the apertures 21 are used as the tube 102 without using the sound absorbing members 1. Accordingly, the frequency in which the sound absorbing structure 100 can absorb sound can be lower as the sound absorbing structure 100 is made thinner. Although the resonance frequency $f_0$ can also be lower by decreasing the aperture ratio P, the number of Helmholtz resonators per unit area included in the sound absorbing structure 100 decreases in this case, resulting in reduction of the sound absorbing effect.

Since the sound absorbing members 1 support the base material 20 with respect to the wall body 200, the sound absorbing members 1 function as spacers that define the distance between the wall body 200 and the base material 20. Therefore, variation in the distance L described above according to the positions in the planar direction in the sound absorbing structure 100 can be reduced. As a result, the sound absorbing structure 100 can provide desired sound absorbing effects.

A refinement according to the present disclosure is explained below. In the embodiment exemplified below, for elements having functions or effects identical to those of the previous embodiment, reference signs used in the descriptions of the previous embodiment are used, and detailed explanations of such elements are omitted as appropriate.

Figure 7:
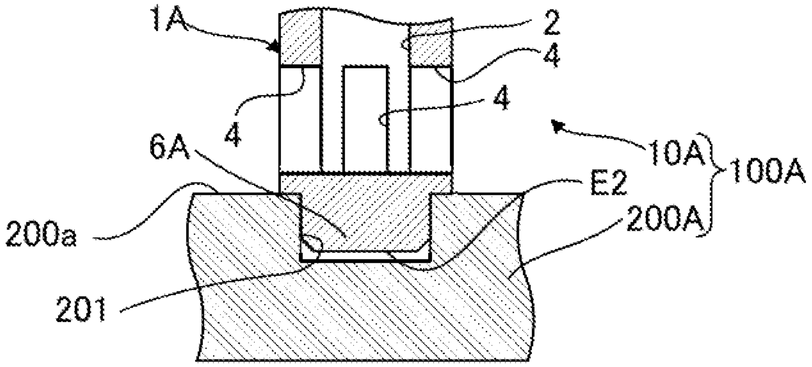
FIG. 7 is a diagram illustrating a fixed state of sound absorbing members and a wall body in a sound absorbing structure.

FIG. 7 is a diagram illustrating a fixed state of sound absorbing members 1A and a wall body 200A in a sound absorbing structure 100A according to the embodiment. The sound absorbing structure 100A illustrated in FIG. 7 includes a sound absorbing apparatus 10A and the wall body 200A. The sound absorbing apparatus 10A is identical to the sound absorbing apparatus 10 in the previous embodiment described above, except for including the sound absorbing members 1A instead of the sound absorbing members 1 in the previous embodiment. The sound absorbing members 1A are identical to the sound absorbing members 1 in the previous embodiment except for having a bottom 6A instead of the bottom 6. The bottom 6A has a portion with a width decreasing toward the second end face E2. The wall body 200A is identical to the wall body 200 in the previous embodiment except for including recesses 201 respectively fitted with the portions of the bottoms 6A. The recesses 201 are an example of a plurality of recesses, to each of which a corresponding one of the sound absorbing members 1A is fixed. Although the wall body 200A is a single member in the example illustrated in FIG. 7, the wall body 200A is not limited thereto and, for example, two or more members may be bonded to each other to constitute the wall body 200A.

In the sound absorbing structure 100A described above, with the wall body 200A including the recesses 201 to each of which the corresponding one of the sound absorbing members 1A is fixed, the sound absorbing members 1A can be fixed to the wall body 200A without using a bonding agent. Furthermore, the sound absorbing members 1A can be more easily attached to the wall body 200A and more easily detached from the wall body 200A as compared to a case of using a bonding agent as well as the previous embodiment described above, and the sound absorbing members 1A can be replaced with other sound absorbing members having different characteristics or the like, as required. This enables the sound absorbing characteristics of the sound absorbing structure 100A to be easily changed. The sound absorbing members 1A may also be fixed to the wall body 200A by using an adhesive or pressure-sensitive adhesive identical to that in the previous embodiment.

Another refinement according to the present disclosure is explained below. In the embodiment exemplified below, for elements having functions or effects identical to those of the previous embodiment, reference signs used in the descriptions of the previous embodiment are used, and detailed explanations of such elements are omitted as appropriate.

Figure 8:
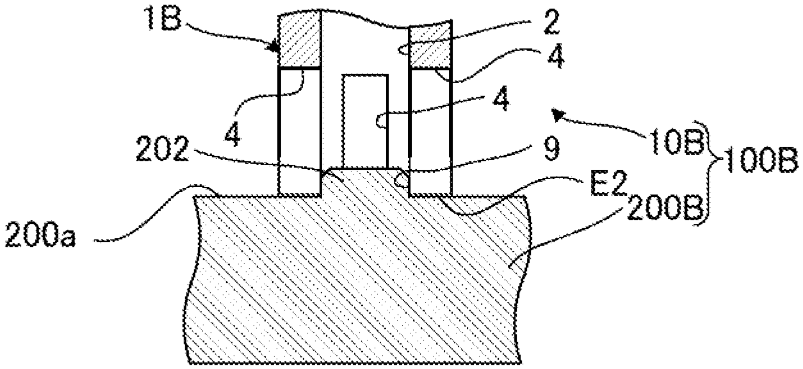
FIG. 8 is a diagram illustrating a fixed state of sound absorbing members and a wall body in a sound absorbing structure.

FIG. 8 is a diagram illustrating a fixed state of sound absorbing members 1B and a wall body 200B in a sound absorbing structure 100B according to the embodiment. The sound absorbing structure 100B illustrated in FIG. 8 includes a sound absorbing apparatus 10B and the wall body 200B. The sound absorbing apparatus 10B is identical to the sound absorbing apparatus 10 in the previous embodiment described above except for including the sound absorbing members 1B instead of the sound absorbing members 1 in the previous embodiment. The sound absorbing members 1B are identical to the sound absorbing members 1 in the previous embodiment except for including a third opening 9 instead of the bottom 6. The wall body 200B is identical to the wall body 200 in the previous embodiment, except for including protrusions 202 respectively fitted with the third openings 9 of the sound absorbing members 1B. The protrusions 202 are an example of a plurality of protrusions, to each of which a corresponding one of the sound absorbing members 1B is fixed. Although the wall body 200B is a single member in the example illustrated in FIG. 8, the wall body 200B is not limited thereto and, for example, two or more members may be bonded to each other to constitute the wall body 200B.

In the sound absorbing structure 100B described above, with the wall body 200B including the protrusions 202, to each of which the corresponding one of the sound absorbing members 1B is fixed, an effect identical to that of the recesses 201 in the previous embodiment described above is obtained. In this case, provision of the third opening 9 on the second end face E2 enables the third opening 9 and the corresponding one of the protrusions 202 that are to be fitted with each other to fix the sound absorbing member 1B to the wall body 200B. The sound absorbing members 1 may be fixed to the wall body 200B in a configuration in which a recess to be fitted with the protrusion 202 is provided on the bottom 6 of each of the sound absorbing members 1 as in the previous embodiment described above. However, relative to this configuration, the configuration of the present embodiment has an advantage in that it can be more easily manufactured by injection molding or the like. The sound absorbing members 1B may also be fixed to the wall body 200B by using an adhesive or pressure-sensitive adhesive identical to that in the previous embodiment.

Another refinement of the present disclosure is explained below. In the embodiment exemplified below, as for elements having functions or effects identical to those of the previous embodiment, reference signs used in the descriptions of the previous embodiment are used, and detailed explanations of such elements are omitted as appropriate.

Figure 9:
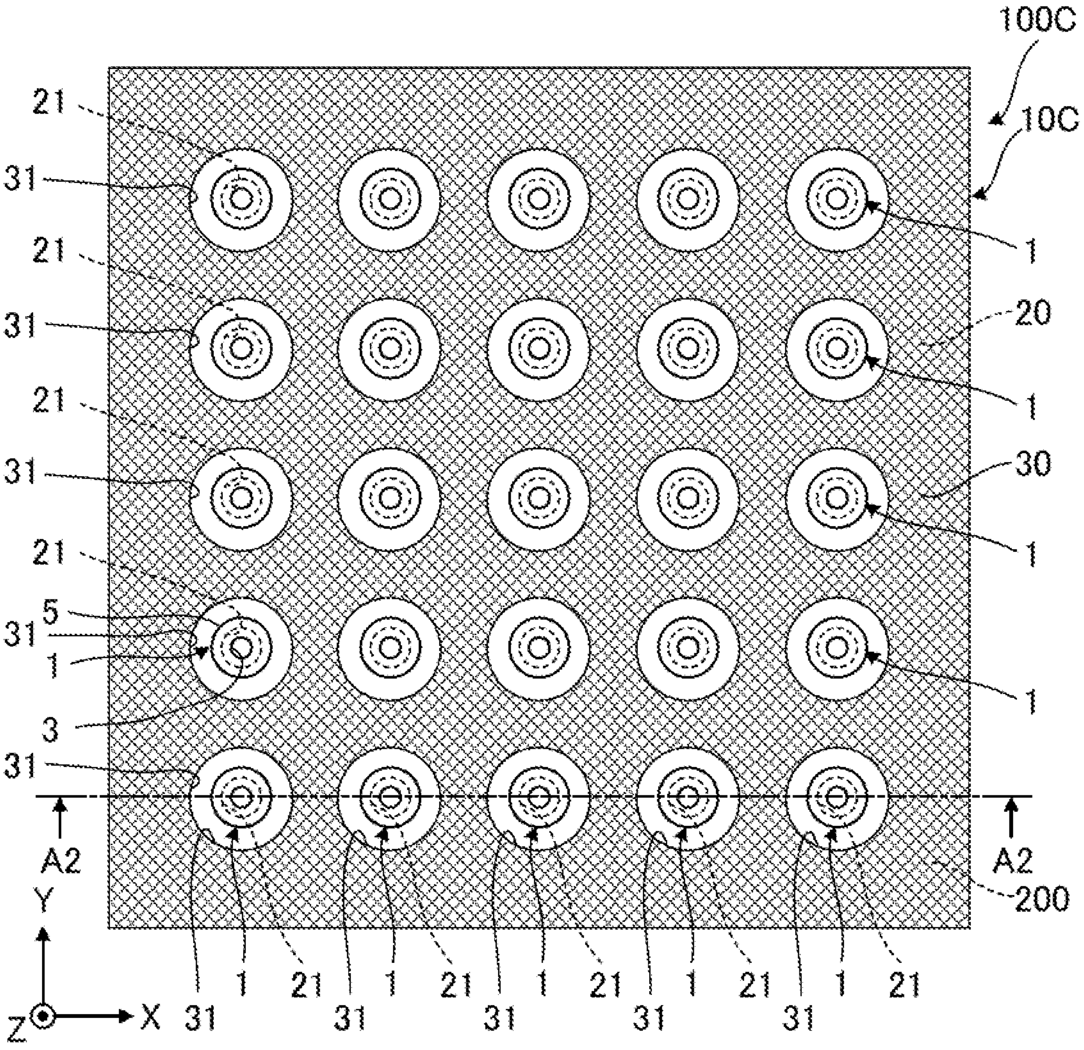
FIG. 9 is a plan view of a sound absorbing structure.
Figure 10:
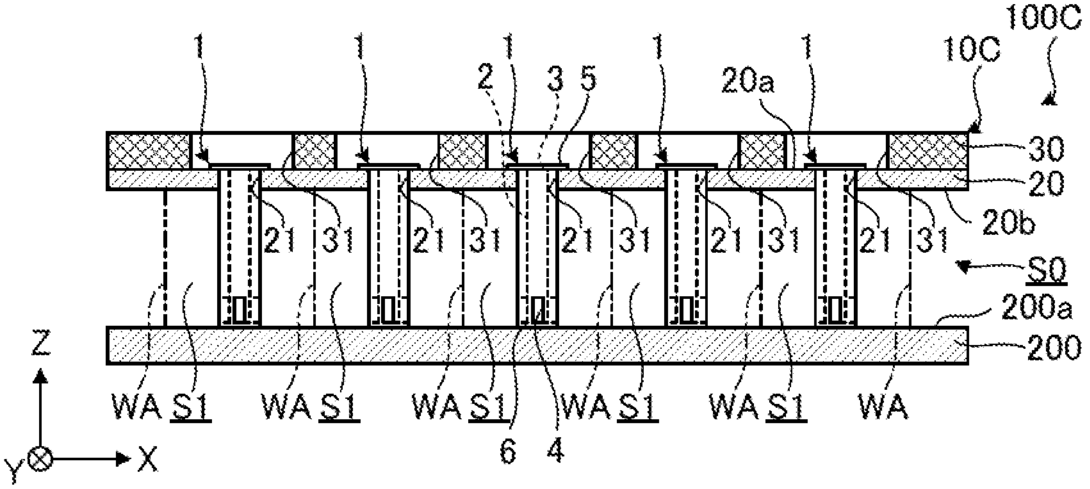
FIG. 10 is a sectional view along line A2-A2 in FIG. 9.

FIG. 9 is a plan view of a sound absorbing structure 100C according to the present embodiment. FIG. 10 is a sectional view along line A2-A2 in FIG. 9. The sound absorbing structure 100C illustrated in FIG. 9 includes a sound absorbing apparatus 10C and the wall body 200. The sound absorbing apparatus 10C is identical to the sound absorbing apparatus 10 in the previous embodiment described above, except for having a porous material 30. The porous material 30 is arranged on a first surface 20*a* of the base material 20. The base material 20 includes the first surface 20*a* and a second surface 20*b* opposite to the first surface 20*a*. The first surface 20*a* is positioned closer to the first end face E1 than the second surface 20*b*. The porous material 30 is a plate-like or sheet-like porous body that has apertures 31 respectively overlapping with the apertures 21 of the base material 20 in a planar view. The apertures 21 are an example of first 15 apertures, and the apertures 31 are an example of second apertures. The porous material 30 may be pliable, in other words, may be flexible. Due to the pliability of the porous material 30, the porous material 30 can be arranged along the wall surface 200*a* of the wall body 200 even when the wall surface 200*a* is a curved surface. The porous material 30 is formed of, for example, a porous body such as glass fiber, felt, or urethane foam. The porous material 30 formed of the porous body can absorb sound in a higher frequency band than the frequency band in which sound can be absorbed due to Helmholtz resonance. Accordingly, the frequency band in which the sound absorbing structure 100C can absorb sound can be widened compared 25 to a case in which the porous material 30 is not used.

The apertures 31 are arranged to correspond to the apertures 21 of the base material 20, respectively, and overlap with the corresponding apertures 21 in a planar view, respectively. In the example illustrated in FIG. 9, the apertures 31 are regularly arranged in a matrix in a planar view to correspond to the apertures 21, respectively. The opening area of each of the apertures 31 is larger than the opening area of each of the apertures 21. Therefore, interference of the porous material 30 with the sound absorbing action due to Helmholtz resonance produced by the sound absorbing structure 100C can be reduced.

The aperture ratio of the apertures 31 to the porous material 30 may be equal to or less than 50% and may be not less than 1% and not more than 50%. In a case in which the aperture ratio is in this range, the sound absorbing effects of the porous material 30 can be satisfactory to an extent similar to that in a case in which porous material 30 has no apertures 31. In contrast thereto, if the aperture ratio is too high, the sound absorbing effect of the porous material 30 tends to steeply decrease. On the other hand, if the aperture ratio is too low, it is difficult to cause the opening area of the aperture 31 to be larger than the opening area of the aperture 21 in a case in which the aperture ratio based on the aperture 21 is high.

The opening area of the aperture 31 may be larger than the opening area of the aperture 21. The opening area of the aperture 31 may be equal to or larger than 1.5 times as large as the opening area of the aperture 21. The sound absorbing effect due to Helmholtz resonance can be appropriately satisfactory in this case. This is because the viscosity resistance of air around the first openings 3 can be used without being interfered with by the porous material 30, and consequently, the sound absorbing effect due to Helmholtz resonance is appropriately satisfactory.

2. Application Examples

Application examples of the sound absorbing structure 100, 100A, 100B, or 100C described above are explained below.

2-1. Speaker System

Figure 11:
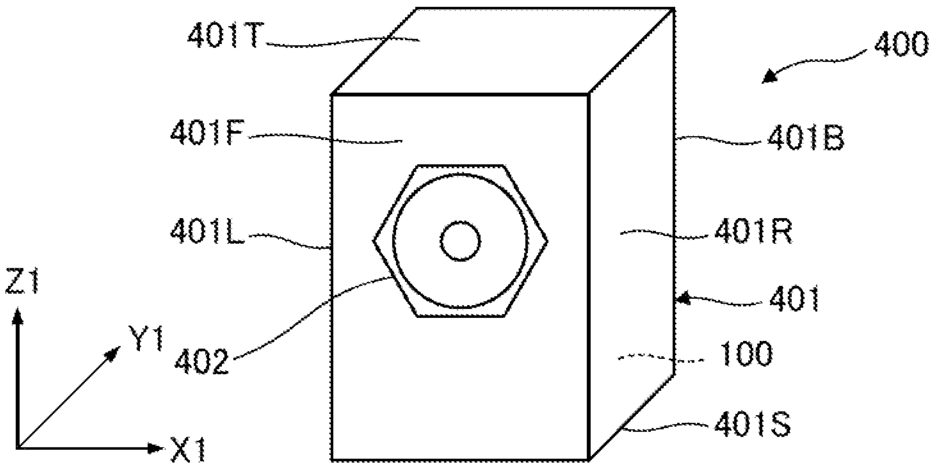
FIG. 11 is a perspective view schematically illustrating an application example in a case in which the sound absorbing structure is installed in a speaker system.

FIG. 11 is a perspective view schematically illustrating an application example in a case in which the sound absorbing structure 100 is installed in a speaker system 400. The speaker system 400 includes a casing 401, and a speaker apparatus 402 and the sound absorbing structure 100 that are attached to the casing 401. The casing 401 is a hollow cuboid having an opening to which the speaker apparatus 402 is attached. The casing 401 includes a right wall 401R, a left wall 401L, a front wall 401F, a back wall 401B, a top wall 401T, and a bottom wall 401S. The right wall 401R and the left wall 401L face each other in an X1 direction. The front wall 401F and the back wall 401B face each other in a Y1 direction. The top wall 401T and the bottom wall 401S face each other in a Z1 direction. The X1 direction, the Y1 direction, and the Z1 direction illustrated in FIG. 11 are orthogonal to each other.

Figure 12:
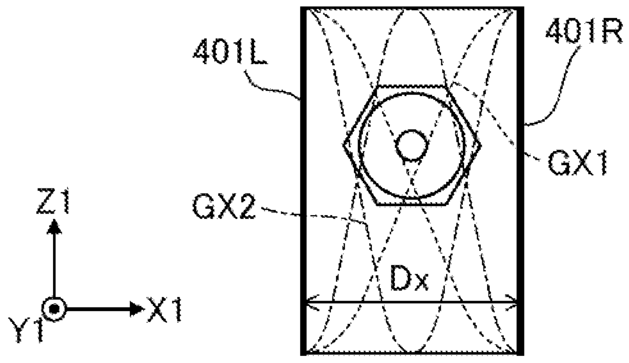
FIG. 12 is a diagram schematically illustrating a state of standing waves generated between a right wall and a left wall of a casing of the speaker system.
Figure 13:
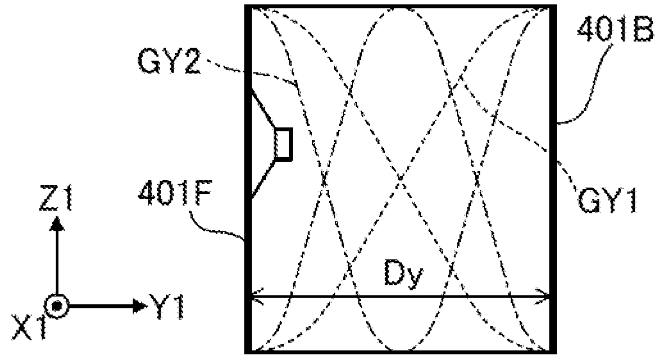
FIG. 13 is a diagram schematically illustrating a state of standing waves generated between a front wall and a back wall of the casing of the speaker system.
Figure 14:
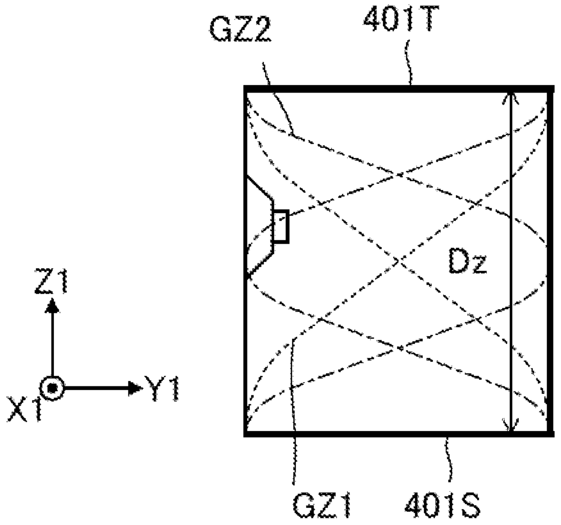
FIG. 14 is a diagram schematically illustrating a state of standing waves generated between a top wall and a bottom wall of the casing of the speaker system.

FIG. 12 is a diagram schematically illustrating a state of standing waves GX1 and GX2 generated between the right wall 401R and the left wall 401L. FIG. 13 is a diagram schematically illustrating a state of standing waves GY1 and GY2 generated between the front wall 401F and the back wall 401B. FIG. 14 is a diagram schematically illustrating a state of standing waves GZ1 and GZ2 generated between the top wall 401T and the bottom wall 401S. Each of the standing waves GX1, GY1, GZ1, GX2, GY2, and GZ2 illustrated in FIGS. 12 to 14 is a standing wave in one dimension (an axial wave). The standing wave GX1 is a first-order standing wave in the X1 direction. The standing wave GY1 is a first-order standing wave in the Y1 direction. The standing wave GZ1 is a first-order standing wave in the Z1 direction. The standing wave GX2 is a second-order standing wave in the X1 direction. The standing wave GY2 is a second-order standing wave in the Y1 direction. The standing wave GZ2 is a second-order standing wave in the Z1 direction. In FIGS. 12 to 14, each of the standing waves GX1, GY1, and GZ1 is indicated by a broken line and each of the standing waves GX2, GY2, and GZ2 is indicated by a dashed dotted line.

The sound absorbing structure 100 is installed on a part of, or all over, the region of one or more of the inner surfaces of one or a plurality of the six walls of the casing 401 described above. For example, in a case in which the sound absorbing structure 100 is installed on one or more of the inner surfaces of one or both of the right wall 401R and the left wall 401L, the standing wave GX1 or GX2 described above can be reduced by setting the frequency band in which the sound absorbing structure 100 can absorb sound according to the frequency of the standing wave GX1 or GX2. Similarly, in a case in which the sound absorbing structure 100 is installed on one or more of the inner surfaces of one or both of the front wall 401F and the back wall 401B, the standing wave GY1 or GY2 described above can be reduced by setting the frequency band in which the sound absorbing structure 100 can absorb sound according to the frequency of the standing wave GY1 or GY2. Furthermore, in a case in which the sound absorbing structure 100 is installed on one or more of the inner surfaces of one or both of the top wall 401T and the bottom wall 401S, the standing wave GZ1 or GZ2 described above can be reduced by setting the frequency band in which the sound absorbing structure 100 can absorb sound according to the frequency of the standing wave GZ1 or GZ2. The audio quality of the speaker system 400 can be improved by reducing one or a plurality of the standing waves GX1, GY1, GZ1, GX2, GY2, and GZ2 as described above.

The frequency band in which the sound absorbing structure 100 can absorb sound may be set according to the frequency of a standing wave in two dimensions (a tangential wave) or three dimensions (an oblique wave). In this case, a two-dimensional or three-dimensional standing wave in the casing 401 can be reduced. The frequency band in which the sound absorbing structure 100 can absorb sound may be set according to the frequency of a standing wave of a high order equal to or higher than a third order. In this case, a third or higher-order standing wave in the casing 401 can be reduced. Although a case in which the sound absorbing structure 100 is installed in the speaker system 400 is illustrated in FIG. 11, the sound absorbing structure 100A, 100B, or 100C may be used instead of the sound absorbing structure 100.

2-2. Vehicle Door

Figure 15:
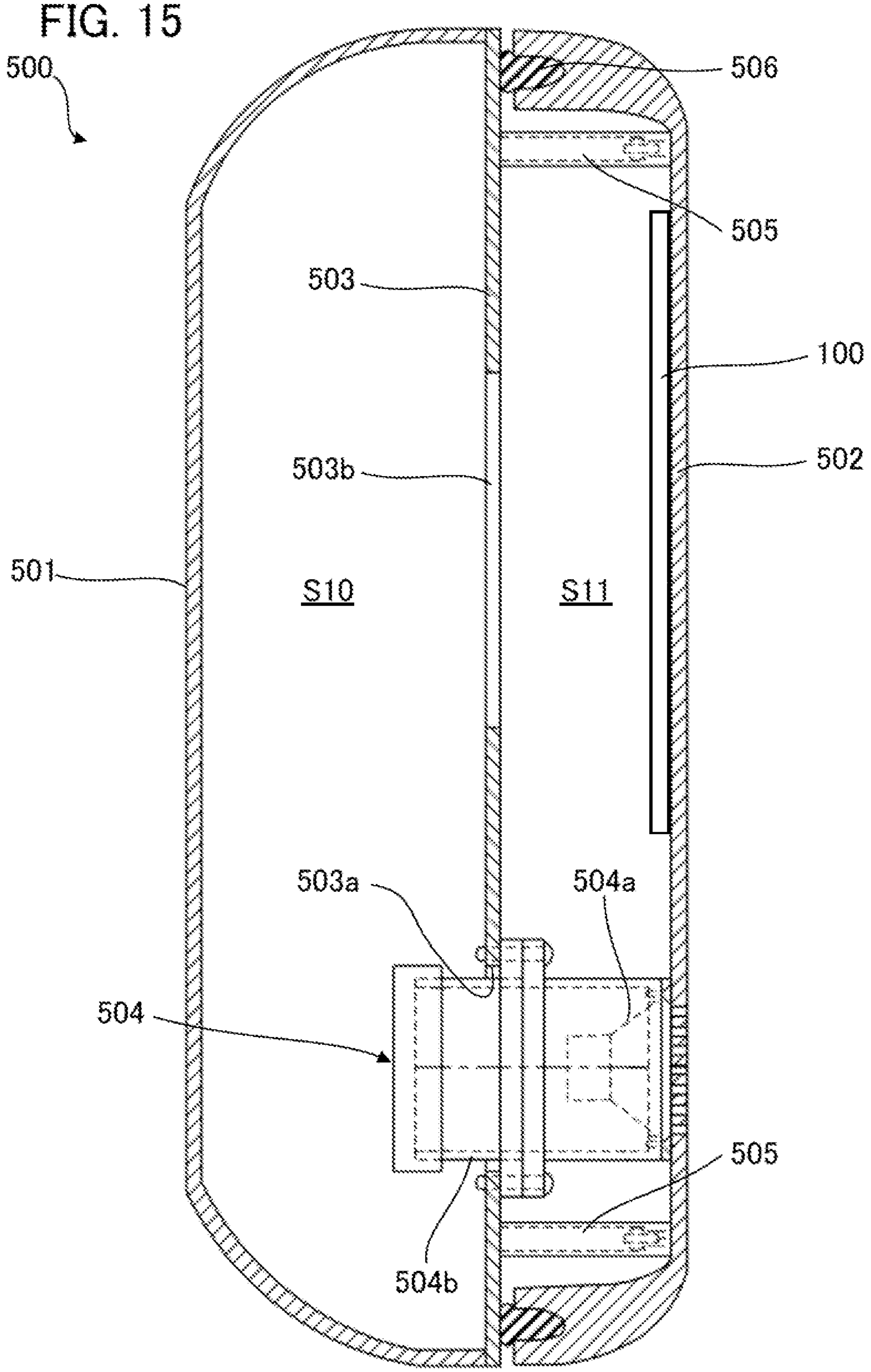
FIG. 15 is a sectional view schematically illustrating an application example in a case in which the sound absorbing structure is installed on a vehicle door.

FIG. 15 is a sectional view schematically illustrating an application example in a case in which the sound absorbing structure 100 is installed on a vehicle door 500. The door 500 illustrated in FIG. 15 includes a first panel 501 referred to as "outer panel", a second panel 502 referred to as "door trim", a third panel 503 referred to as "inner panel", a speaker apparatus 504 attached to the third panel 503, and the sound absorbing structure 100 attached to the second panel 502.

Each of the first panel 501 and the third panel 503 is generally formed of a steel plate. The first panel 501 and the third panel 503 are joined to each other by welding or the like. A space S10 is formed between the first panel 501 and the third panel 503. A part of the speaker apparatus 504, a window pane (not illustrated), a window pane raising and lowering mechanism, a door lock mechanism, and the like are arranged in the space S10. The first panel 501 or the third panel 503 may be formed of, for example, an aluminum alloy or a carbon material.

Openings 503*a* and 503*b* are provided on the third panel 503. The opening 503*a* is an opening for attaching the speaker apparatus 504 to the third panel 503. The opening 503*b* is, for example, an opening used for work in the space S10 described above. The opening 503*b* may be sealed by the sound absorbing structure 100 or may be sealed by a simple resin sheet.

The second panel 502 is formed of, for example, resin. The second panel 502 is fixed to the third panel 503 with coupling mechanisms 505. The coupling mechanisms 505 may have any configuration as long as the coupling mechanisms 505 can fix the second panel 502 to the third panel 503.

A space S11 is formed between the second panel 502 and the third panel 503. A part of the speaker apparatus 504 not arranged in the space S10 is arranged in the space S11. A packing 506 formed of rubber or the like is arranged between the second panel 502 and the third panel 503 along an outer circumference of the second panel 502.

The sound absorbing structure 100 is installed on the inner surface of the second panel 502. The frequency band in which the sound absorbing structure 100 can absorb sound is set, for example, according to the frequency of a standing wave in the space S10 or S11 described above. This setting of the frequency band can enhance the audio quality of the speaker apparatus 504. Penetration of road noise or the like from the outside into the vehicle can also be reduced by appropriately setting the frequency band in which the sound absorbing structure 100 can absorb sound. The wall body 200 included in the sound absorbing structure 100 may be unitarily formed with the second panel 502 or may be a different body from the second panel 502. In a case in which the wall body 200 is a different body from the second panel 502, the wall body 200 is fixed to the second panel 502, for example, with an adhesive or a pressure-sensitive adhesive.

The speaker apparatus 504 includes, for example, a speaker body 504*a* and a tubular housing 504*b* that houses the speaker body 504*a*. The speaker body 504*a* is fixed to the housing 504*b* by screwing or the like. The housing 504*b* is fixed to the third panel 503 by screwing or the like with the housing 504*b* penetrating through the opening 503*a* of the third panel 503.

While FIG. 15 illustrates a case in which the sound absorbing structure 100 is installed on the door 500, the sound absorbing structure 100A, 100B, or 100C may be used instead of the sound absorbing structure 100. While the door 500 is illustrated in FIG. 15, the sound absorbing structure 100 may be installed on a part other than the door of a vehicle, for example, a roof panel or a floor panel. The sound absorbing structure 100 may be installed on a mobile object other than a vehicle.

The present disclosure is not limited to the embodiments described above, and various modifications, described below, can be made thereto. In addition, each of the embodiments and each of the modifications may be combined with others as appropriate.

In the embodiments described above, the configuration in which the sound absorbing members 1, 1A, or 1B are inserted into the apertures 21 of the base material 20, respectively, is illustrated. However, the configuration is not limited thereto, and members different from all of the sound absorbing members 1, 1A, and 1B may be respectively inserted into some apertures 21 among all the apertures 21. The aperture 21 can function as a tube of a Helmholtz resonator even if no member is inserted into the aperture 21.

Figure 16:
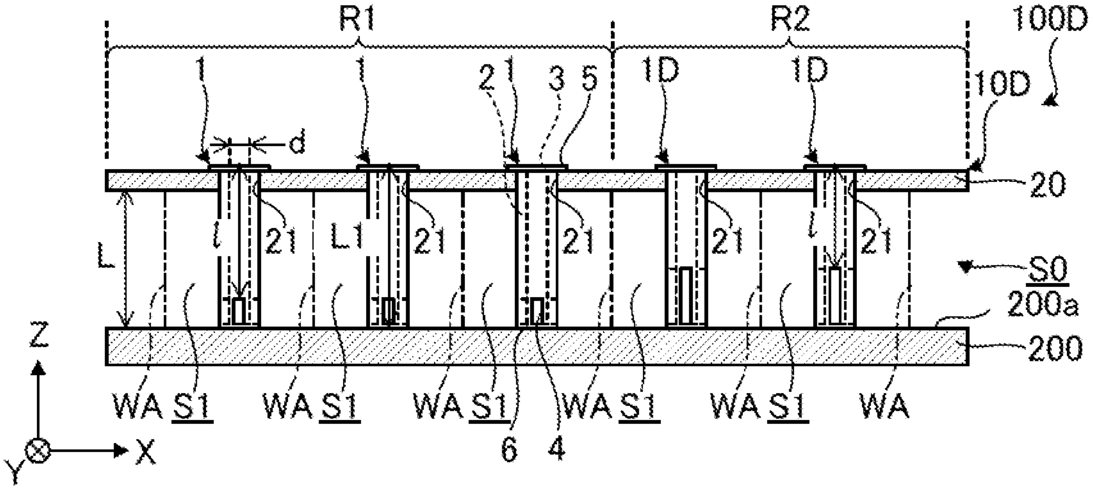
FIG. 16 is a sectional view of a sound absorbing structure.

FIG. 16 is a sectional view of a sound absorbing structure 100D according to a first modification. The sound absorbing structure 100D illustrated in FIG. 16 includes a sound absorbing apparatus 10D and the wall body 200. The sound absorbing apparatus 10D is identical to the sound absorbing apparatus 10 in the previous embodiment, except that sound absorbing members 1D instead of the sound absorbing members 1 are inserted into some apertures 21 among all the apertures 21 of the base material 20, respectively. That is, the sound absorbing apparatus 10D includes the base material 20 having the apertures 21, and the sound absorbing members 1 and the sound absorbing members 1D inserted into the apertures 21, respectively. Each of the sound absorbing members 1D is identical to the sound absorbing members 1 except that the length l of the sound absorbing members 1D is different from the length l of the sound absorbing members 1. The length l of the sound absorbing members 1D is shorter than the length l of the sound absorbing members 1. Therefore, the resonance frequency of a Helmholtz resonator using the sound absorbing member 1D is higher than the resonance frequency of the Helmholtz resonator using the sound absorbing member 1.

In the example illustrated in FIG. 16, the sound absorbing structure 100D is divided into two regions that include a region R1 in which the sound absorbing members 1 are arranged and a region R2 in which the sound absorbing members 1D are arranged. With this division, the sound absorbing structure 100D provides sound absorbing effects not only in the frequency band of sound absorbed due to Helmholtz resonance produced by using the sound absorbing members 1, but also in the frequency band of sound absorbed due to Helmholtz resonance produced by using the sound absorbing members 1D. Accordingly, the frequency band in which sound can be absorbed can be widened compared to a case in which only one of the sound absorbing members 1 and 1D is used. Planar view shapes or arrangement of the regions R1 and R2 are determined according to the sound absorbing characteristics required for the sound absorbing structure 100D and can be freely selected.

Figure 17:
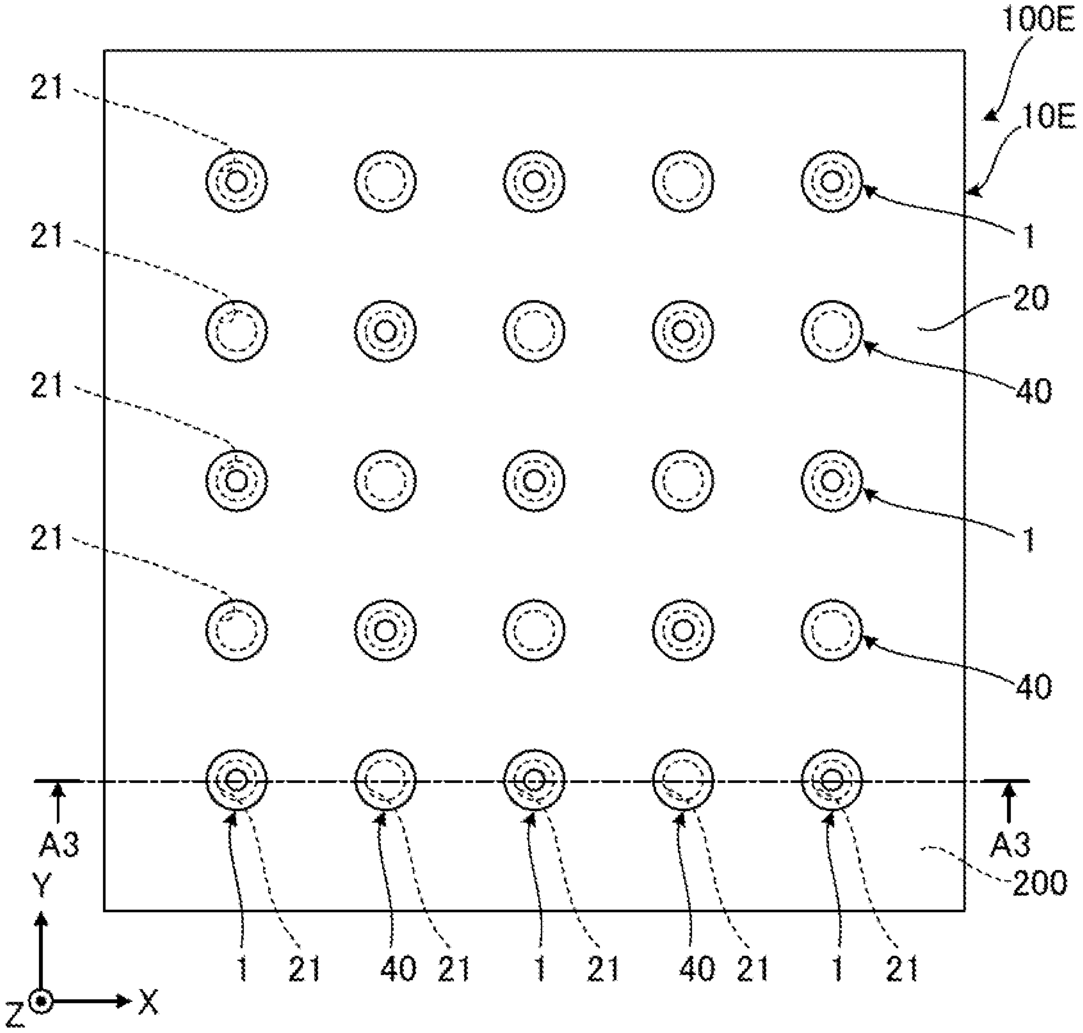
FIG. 17 is a plan view of a sound absorbing structure.
Figure 18:
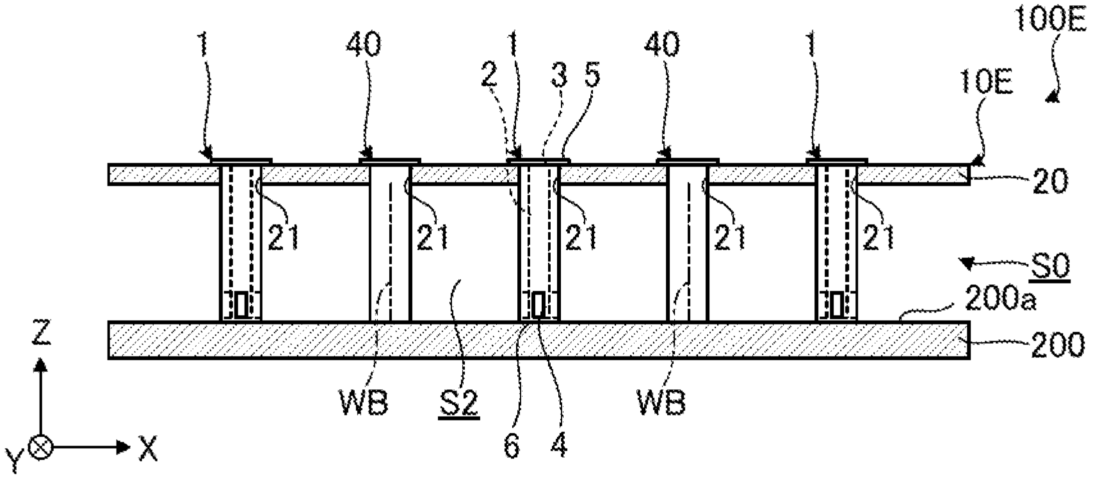
FIG. 18 is a sectional view along line A3-A3 in FIG. 17.

FIG. 17 is a plan view of a sound absorbing structure 100E according to a second modification. FIG. 18 is a sectional view along line A3-A3 in FIG. 17. The sound absorbing structure 100E illustrated in FIGS. 17 and 18 includes a sound absorbing apparatus 10E and the wall body 200. The sound absorbing apparatus 10E is identical to the sound absorbing apparatus 10 in the previous embodiment, except that a plug member 40 instead of the sound absorbing member 1 is inserted into some apertures 21 among all the apertures 21 of the base material 20. That is, the sound absorbing apparatus 10E includes the base material 20 having the apertures 21, and the sound absorbing members 1 and the plug members 40 inserted into the apertures 21, respectively. Each of the plug members 40 is a member that seals the aperture 21. The plug members 40 illustrated in FIG. 18 are identical to the sound absorbing members 1 except for being solid rather than hollow.

As illustrated in FIG. 17, the sound absorbing members 1 and the plug members 40 are arranged alternately in each of the X direction and the Y direction. Therefore, the aperture ratio P of the base material 20 based on the first openings 3 illustrated in FIG. 17 is smaller than the aperture ratio P of the base material 20 based on the first openings 3 in the previous embodiment described above. Accordingly, the frequency band of sound absorbed due to Helmholtz resonance of the sound absorbing structure 100E is lower than the frequency band of the sound absorbed due to Helmholtz resonance of the sound absorbing structure 100 in the previous embodiment described above. Due to balance of pressures from the sound absorbing members 1, walls WB are formed in the space S0 between the base material 20 and the wall body 200. Therefore, the space S0 is divided by the walls WB into spaces S2, respectively corresponding to the sound absorbing members 1. The space S2 is larger than the space S1 in the previous embodiment described above.

Figure 19:
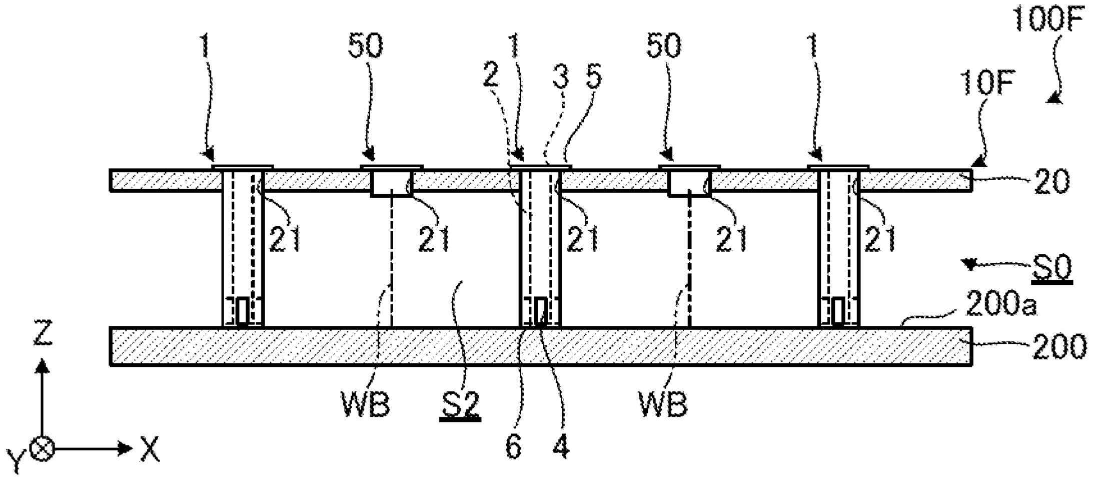
FIG. 19 is a sectional view of a sound absorbing structure.

FIG. 19 is a sectional view of a sound absorbing structure 100F according to a third modification. The sound absorbing structure 100F illustrated in FIG. 19 includes a sound absorbing apparatus 10F and the wall body 200. The sound absorbing apparatus 10F is identical to the sound absorbing apparatus 10E in the second modification described above, except that plug members 50 instead of the plug members 40 are inserted. That is, the sound absorbing apparatus 10F includes the base material 20 having the apertures 21, and the sound absorbing members 1 and the plug members 50 respectively inserted into the apertures 21. The plug members 50 illustrated in FIG. 19 are identical to the plug members 40 except that the length of the plug members 50 is shorter than the length of the plug members 40 described above. The sound absorbing structure 100F can absorb sound in a frequency band identical to the frequency band in which the sound absorbing structure 100E can absorb sound.

Figure 20:
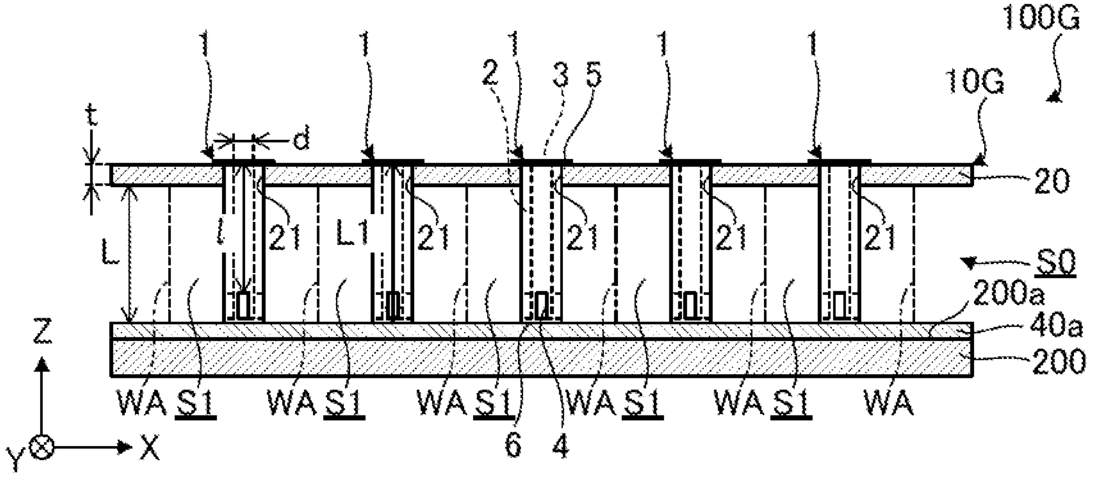
FIG. 20 is a sectional view of a sound absorbing structure.

FIG. 20 is a sectional view of a sound absorbing structure 100G according to a fourth modification. The sound absorbing structure 100G illustrated in FIG. 20 includes a sound absorbing apparatus 10G and the wall body 200. The sound absorbing apparatus 10G is identical to the sound absorbing apparatus 10 in the previous embodiment described above, except for including a support member 40*a*. That is, the sound absorbing apparatus 10G includes the base material 20, the sound absorbing members 1, and the support member 40*a* that supports the base material 20 via the sound absorbing members 1. The support member 40*a* is a member having a plate-like or sheet-like shape. The support member 40*a* may be pliable, similarly to the base material 20, and may be formed of, for example, an elastomer material, a resin material, or a metallic material. The bottoms 6 of the sound absorbing members 1 are fixed to one of the faces of the support member 40*a* with an adhesive or a pressure-sensitive adhesive. The other face of the support member 40*a* is bonded to the wall surface 200*a* of the wall body 200, for example, with an adhesive or a pressure-sensitive adhesive. Installation at the wall surface 200*a* is easily achieved with the sound absorbing apparatus 10G described above.

For example, the following aspects are understood based on at least one of the embodiments and modifications.

One aspect (a first aspect) of a sound absorbing member is to be inserted into an aperture provided on a plate-like or sheet-like base material and have a tubular shape. The sound absorbing member includes a first end face, a second end face opposite to the first end face, and a side face positioned between the first end face and the second end face. The first end face includes a first opening. The side face includes at least one second opening. According to this aspect, the side face of the sound absorbing member includes the at least one second opening. Therefore, the at least one second opening is not sealed by a wall body and the sound absorbing member can be used as a spacer that defines the distance between the base material and the wall body. Therefore, even when the wall surface of the wall body is a curved surface, the distance between the base material and the wall body can be made uniform and a desired sound absorbing effect can therefore be obtained.

In another aspect (a second aspect) of the sound absorbing member, a distance from the at least one second opening to the second end face is shorter than a distance from the at least one second opening to the first end face. According to this aspect, the length of a part of the sound absorbing member corresponding to a tube of a typical Helmholtz resonator can be lengthened relative to a case in which the distance from the at least one second opening to the first end face is shorter than the distance from the at least one second opening to the second end face. Therefore, the frequency band in which the sound absorbing structure can absorb sound can be lowered while the length of the sound absorbing member is shortened.

In still another aspect (a third aspect) of the sound absorbing member, the second end face is a bottom that seals one end of the sound absorbing member. According to this aspect, the area of the second end face can be increased relative to a case in which an opening is provided on the second end face. Therefore, in a case in which the sound absorbing member is fixed to a wall body by bonding the second end face to the wall 20 body with a bonding agent, there is an advantage of it being likely to increase the strength of the bonding. When the second end face is fixed to the wall body with a bonding agent, in a case in which an opening is provided on the second end face, there is a possibility that the bonding agent will penetrate into the opening and that the bonding agent will partially seal 25 the at least one second opening. Accordingly, this case has a problem in that the frequency band in which the sound absorbing structure can absorb sound is likely to vary with variation in the opening area of the at least one second opening. In contrast thereto, the present aspect also has an advantage of being capable of preventing occurrence of the relevant problem.

In still another aspect (a fourth aspect) of the sound absorbing member, the second end face includes a third opening. According to this aspect, providing a protrusion fitted with the third opening on a wall body enables the sound absorbing member to be fixed to the wall body without a bonding agent.

In still another aspect (a fifth aspect) of the sound absorbing member, the side face includes a flange along an outer circumference of the first end face. According to this aspect, the sound absorbing member can be positioned with respect to the base material using the flange. Therefore, variation in the frequency band in which the sound absorbing member can absorb sound caused by misalignment of the sound absorbing member with respect to the base material can be reduced.

In still another aspect (a sixth aspect) of the sound absorbing member, the at least one second opening comprises a plurality of second openings arranged side by side in a circumference direction of the side face. According to this aspect, there is an advantage in that the mechanical strength of the sound absorbing member is likely to be higher than in a configuration in which there is one second opening, even when a required opening area of the at least one second opening is allocated.

In still another aspect (a seventh aspect) of the sound absorbing member, each of the at least one second opening has an opening area equal to or larger than an opening area of the first opening. According to this aspect, the sound absorbing member can appropriately function as a tube of a typical Helmholtz resonator.

One aspect of a sound absorbing apparatus (an eighth aspect) includes a plurality of sound absorbing members, and a plate-like or sheet-like base material having a plurality of first apertures to which the sound absorbing members are respectively inserted, and each of the sound absorbing members is the sound absorbing member according to any of the aspects described above. According to this aspect, a sound absorbing structure using the sound absorbing members can be realized by installing the sound absorbing apparatus on a wall body.

In another aspect (a ninth aspect) of the sound absorbing apparatus, the base material includes a first surface and a second surface opposite to the first surface. The first surface is positioned closer to the first end face than the second surface. A plate-like or sheet-like porous material is arranged on the first surface of the base material The porous material has a plurality of second apertures overlapping with respective ones of the first apertures in a planar view. According to this aspect, the porous material can absorb sound in a higher frequency band than a frequency band in which sound can be absorbed due to Helmholtz resonance. Therefore, the frequency band in which the sound absorbing member can absorb sound can be widened compared to a case in which the porous material is not used.

In still another aspect (a tenth aspect) of the sound absorbing apparatus, an opening area of each of the second apertures is larger than an opening area of each of the first apertures, and an aperture ratio of the porous material based on the second apertures is equal to or less than 50%. According to this aspect, due to the opening area of each of the second apertures being larger than the opening area of each of the first apertures, interference of the porous material with a sound absorbing action based on Helmholtz resonance produced by the sound absorbing apparatus can be reduced. Furthermore, since the aperture ratio of the porous material based on the second apertures is equal to or less than 50%, the sound absorbing effects of the porous material can be satisfactory to a similar extent to that in a case in which the second apertures are not provided.

One aspect (an eleventh aspect) of a sound absorbing structure includes the sound absorbing apparatus according to any one of the aspects described above, and a wall body supporting the base material via the sound absorbing members. According to this aspect, a sound absorbing structure that can achieve a desired sound absorbing effect can be provided even when the wall surface of a wall body is a curved surface.

In another aspect (a twelfth aspect) of the sound absorbing structure, the wall body includes a plurality of recesses, to each of which a corresponding one of the sound absorbing members is fixed, or a plurality of protrusions, to each of which a corresponding one of the sound absorbing members is fixed. According to this aspect, the sound absorbing members can be fixed to the wall body without using a bonding agent. Furthermore, the sound absorbing members can be easily attached to the wall body and easily detached from the wall body. In addition, the sound absorbing members can be replaced as required with other sound absorbing members having different characteristics. Therefore, the sound absorbing characteristics of the sound absorbing structure can be easily changed.

DESCRIPTION OF REFERENCE SIGNS

1 . . . sound absorbing member, 1A . . . sound absorbing member, 1B . . . sound absorbing member, 1D . . . sound absorbing member, 3 . . . first opening, 4 . . . second opening, 5 . . . flange, 6 . . . bottom, 6A . . . bottom, 9 . . . third opening, 10 . . . sound absorbing apparatus, 10A . . . sound absorbing apparatus, 10B . . . sound absorbing apparatus, 10C . . . sound absorbing apparatus, 10D . . . sound absorbing apparatus, 10E . . . sound absorbing apparatus, 10F . . . sound absorbing apparatus, 10G . . . sound absorbing apparatus, 20 . . . base material, 21 . . . aperture, 30 . . . porous material, 31 . . . aperture, 100 . . . sound absorbing structure, 100A . . . sound absorbing structure, 100B . . . sound absorbing structure, 100C . . . sound absorbing structure, 100D . . . sound absorbing structure, 100E . . . sound absorbing structure, 100F . . . sound absorbing structure, 200 . . . wall body, 200A . . . wall body, 200B . . . wall body, 201 . . . recess, 202 . . . protrusion, E1 . . . first end face, E2 . . . second end face, FS . . . side face.

What is claimed is:

1. A sound absorbing member comprising:
a first end face;
a second end face opposite to the first end face; and
a side face positioned between the first end face and the second end face, wherein:
the sound absorbing member is insertable into an aperture provided on a plate-like or sheet-like base material;
the sound absorbing member has a tubular shape;
the first end face includes a first opening; and
the side face includes at least one second opening.

2. The sound absorbing member according to claim 1, wherein a distance from the at least one second opening to the second end face is shorter than a distance from the at least one second opening to the first end face.

3. The sound absorbing member according to claim 1, wherein the second end face is a bottom that seals one end of the sound absorbing member.

4. The sound absorbing member according to claim 1, wherein the second end face includes a third opening.

5. The sound absorbing member according to claim 1, wherein the side face includes a flange along an outer circumference of the first end face.

6. The sound absorbing member according to claim 1, wherein the at least one second opening comprises a plurality of second openings arranged side by side in a circumferential direction of the side face.

7. The sound absorbing member according to claim 6, wherein each of the plurality of second openings has an opening area equal to or larger than an opening area of the first opening.

8. A sound absorbing apparatus comprising:

a plurality of sound absorbing members; and a plate-like or sheet-like base material having a plurality of first apertures to which the sound absorbing members are respectively inserted, wherein:

each of the sound absorbing members has a tubular shape;

each of the sound absorbing members includes a first end face, a second end face opposite to the first end face, and a side face positioned between the first end face and the second end face;

the first end face includes a first opening; and the side face includes at least one second opening.

9. The sound absorbing apparatus according to claim 8, wherein:

the plate-like or sheet-like base material includes a first surface and a second surface opposite to the first surface; and the first surface is positioned closer to the first end face than to the second surface, the sound absorbing apparatus further comprising a plate-like or sheet-like porous material arranged on the first surface of the plate-like or sheet-like base material, the plate-like or sheet-like porous material having a plurality of second apertures overlapping with the plurality of first apertures in a planar view.

10. The sound absorbing apparatus according to claim 9, wherein an opening area of each of the plurality of second apertures is larger than an opening area of each of the plurality of first apertures, and an aperture ratio of the plurality of second apertures to the plate-like or sheet-like porous material is equal to or less than 50%.

11. A sound absorbing structure comprising:

a sound absorbing apparatus; and a wall body, wherein:

the sound absorbing apparatus includes a plurality of sound absorbing members, and a plate-like or sheet-like base material having a plurality of first apertures to which the plurality of sound absorbing members are respectively inserted;

each of the plurality of sound absorbing members has a tubular shape;

each of the plurality of sound absorbing members includes a first end face, a second end face opposite to the first end face, and a side face positioned between the first end face and the second end face;

the first end face includes a first opening;

the side face includes at least one second opening; and the wall body supports the base material via the plurality of sound absorbing members.

12. The sound absorbing structure according to claim 11, wherein the wall body includes a plurality of recesses, to each of which a corresponding one of the plurality of sound absorbing members is fixed.

13. The sound absorbing structure according to claim 11, wherein the wall body includes a plurality of protrusions, to each of which a corresponding one of the plurality of sound absorbing members is fixed.

* * * * *